United States Patent
Otsura et al.

(10) Patent No.: US 10,926,628 B2
(45) Date of Patent: Feb. 23, 2021

(54) FUEL CELL VEHICLE

(71) Applicant: TOYOTA JIDOSHA KABUSHIKI KAISHA, Toyota (JP)

(72) Inventors: Takanori Otsura, Toyota (JP); Shigeaki Murata, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 84 days.

(21) Appl. No.: 15/899,046

(22) Filed: Feb. 19, 2018

(65) Prior Publication Data
US 2018/0272863 A1 Sep. 27, 2018

(30) Foreign Application Priority Data
Mar. 22, 2017 (JP) .............................. JP2017-055728

(51) Int. Cl.
*B60K 15/07* (2006.01)
*B62D 25/20* (2006.01)
(Continued)

(52) U.S. Cl.
CPC .............. *B60K 15/07* (2013.01); *B60K 13/04* (2013.01); *B60K 15/03006* (2013.01); *B60K 15/067* (2013.01); *B60L 50/71* (2019.02); *B62D 21/16* (2013.01); *B62D 25/20* (2013.01); *B62D 35/02* (2013.01); *B60K 2015/03315* (2013.01); *B60K 2015/0634* (2013.01); *B62D 21/155* (2013.01); *H01M 2250/20* (2013.01); *Y02T 10/70* (2013.01); *Y02T 90/40* (2013.01)

(58) Field of Classification Search
CPC .. B60K 15/07; B60K 15/03006; B60K 13/04; B60K 15/067; F01N 13/1822; F01N 2590/11; B60L 50/71; B62D 25/20; B62D 25/35; B62D 25/02
See application file for complete search history.

(56) References Cited

U.S. PATENT DOCUMENTS 5,370,418 A * 12/1994 Pugh ................. B60K 15/03006
                                                             180/311
5,673,939 A * 10/1997 Bees ........................ B60K 1/04
                                                             280/831
(Continued)

FOREIGN PATENT DOCUMENTS

JP      2000343958 A     12/2000
JP      2009051296 A     3/2009
(Continued)

*Primary Examiner* — Ruth Ilan
*Assistant Examiner* — Harold Eric Pahlck, III
(74) *Attorney, Agent, or Firm* — Dickinson Wright PLLC

(57) ABSTRACT

A fuel cell vehicle mounted with a fuel gas tank in an underfloor of the vehicle. The fuel cell vehicle includes: a floor that has a projecting portion projecting upward in a height direction of the vehicle and extending along a front and rear direction of the vehicle; a fuel gas tank arranged under the projecting portion in the height direction of the vehicle and fixed to the floor; and an undercover arranged under the fuel gas tank in the height direction of the vehicle. The undercover has a fixation protruded portion that projects upward in the height direction of the vehicle in a side of the fuel gas tank in a width direction of the vehicle, and being fixed to the floor by the fixation protruded portion.

3 Claims, 7 Drawing Sheets

(51) Int. Cl.
*B60K 15/03* (2006.01)
*B62D 21/16* (2006.01)
*B60K 15/067* (2006.01)
*B60L 50/71* (2019.01)
*B60K 13/04* (2006.01)
*B62D 35/02* (2006.01)
*B62D 21/15* (2006.01)
*B60K 15/063* (2006.01)

(56) References Cited

U.S. PATENT DOCUMENTS

| | | | | |
|---|---|---|---|---|
| 6,257,360 B1 * | 7/2001 | Wozniak | ............... | B60K 15/013 |
| | | | | 180/69.5 |
| 6,827,371 B2 * | 12/2004 | Greil | .................... | B60K 15/067 |
| | | | | 280/834 |
| 7,232,156 B2 * | 6/2007 | Rife | ..................... | B60K 15/063 |
| | | | | 280/834 |
| 7,303,211 B2 * | 12/2007 | Borroni-Bird | ......... | B62D 21/16 |
| | | | | 280/831 |
| 7,815,250 B2 * | 10/2010 | Oshio | .................... | B62D 35/02 |
| | | | | 296/204 |
| 8,047,574 B2 * | 11/2011 | Hofner | ............. | B60K 15/03006 |
| | | | | 280/830 |
| 8,056,928 B2 * | 11/2011 | Ijaz | ..................... | B60K 15/013 |
| | | | | 280/830 |
| 8,302,997 B2 * | 11/2012 | Veenstra | ................ | B60K 15/07 |
| | | | | 137/267 |
| 8,505,672 B2 * | 8/2013 | Schulze | ................... | B60K 1/04 |
| | | | | 180/309 |
| 8,936,220 B2 * | 1/2015 | Schulze | ................... | B60K 1/04 |
| | | | | 248/68.1 |
| 8,960,360 B2 * | 2/2015 | Sangha | ................... | B60K 13/06 |
| | | | | 180/309 |
| 9,878,611 B1 * | 1/2018 | Abd Elhamid | ......... | F02B 43/10 |
| 9,932,072 B2 * | 4/2018 | Imura | .................. | B62D 21/157 |
| 2009/0032318 A1 * | 2/2009 | Ishitoya | .................... | B60K 1/04 |
| | | | | 180/65.31 |
| 2009/0102220 A1 | 4/2009 | Oshio et al. | | |
| 2012/0217251 A1 | 8/2012 | Handa | | |
| 2016/0052567 A1 * | 2/2016 | Pugh | ..................... | B62D 49/04 |
| | | | | 280/638 |
| 2016/0200191 A1 | 7/2016 | Ito et al. | | |
| 2017/0096172 A1 | 4/2017 | Nagaosa | | |

FOREIGN PATENT DOCUMENTS

| | | |
|---|---|---|
| JP | 2009096438 A | 5/2009 |
| JP | 2015231319 A | 12/2015 |
| JP | 2016130103 A | 7/2016 |
| JP | 2017007549 A | 1/2017 |
| WO | 2011055652 A1 | 5/2011 |

* cited by examiner

FUEL CELL VEHICLE

CROSS REFERENCE TO RELATED APPLICATIONS

The present application claims the priority based on Japanese Patent Application No. 2017-055728 filed on Mar. 22, 2017, the disclosure of which is hereby incorporated by reference in its entirety.

BACKGROUND

Field

The present disclosure relates to a fuel cell vehicle.

Related Art

Recently, a vehicle mounted with a fuel cell as a new power source has been developed. Japanese Patent Application Publication No. 2015-231319, Japanese Patent Application Publication No. 2009-51296 and Japanese Patent Application Publication No. 2017-7549 disclose a fuel cell vehicle having a structure in which a hydrogen tank as a fuel gas tank is arranged in a center tunnel in an underfloor of the vehicle.

Generally, an underfloor of a vehicle is attached with an undercover for protecting components arranged in the underfloor of the vehicle and improving aerodynamic performance, noise and vibration (NV) performance, waterproof performance, and the like. However, in a vehicle arranged with a hydrogen tank in a center tunnel in the underfloor, the undercover cannot be fixed directly to the floor of the vehicle, in a lower side of the hydrogen tank. This is because, in a region where the hydrogen tank is arranged in between the floor of the vehicle and the undercover, the hydrogen tank disturbs the fixation. In addition, since the undercover cannot be fixed directly to the hydrogen tank itself, the undercover cannot be fixed to the floor of the vehicle via the hydrogen tank. Therefore, compared to the vehicle in which the hydrogen tank is not arranged in the center tunnel in the underfloor, such vehicle may have a larger pitch of a portion fixing the undercover, in a width direction of the vehicle. When a fixation pitch is larger, flapping in the undercover may be generated due to variation of the air hitting the undercover, vibration of the vehicle, and the like, and attachment strength may be decreased.

SUMMARY

In order to address at least a part of the problem described above, the present disclosure can be performed in embodiments described below.

According to an embodiment of the present disclosure, a fuel cell vehicle mounted with a fuel gas tank in an underfloor of the vehicle is provided. The fuel cell vehicle includes: a floor that has a projecting portion projecting upward in a height direction of the vehicle and extending along a front and rear direction of the vehicle; a fuel gas tank arranged under the projecting portion in the height direction of the vehicle and fixed to the floor; and an undercover arranged under the fuel gas tank in the height direction of the vehicle. the undercover has a fixation protruded portion that projects upward in the height direction of the vehicle in a side of the fuel gas tank in a width direction of the vehicle, and being fixed to the floor by the fixation protruded portion.

DETAILED DESCRIPTION

A. First Embodiment

Figure 1:
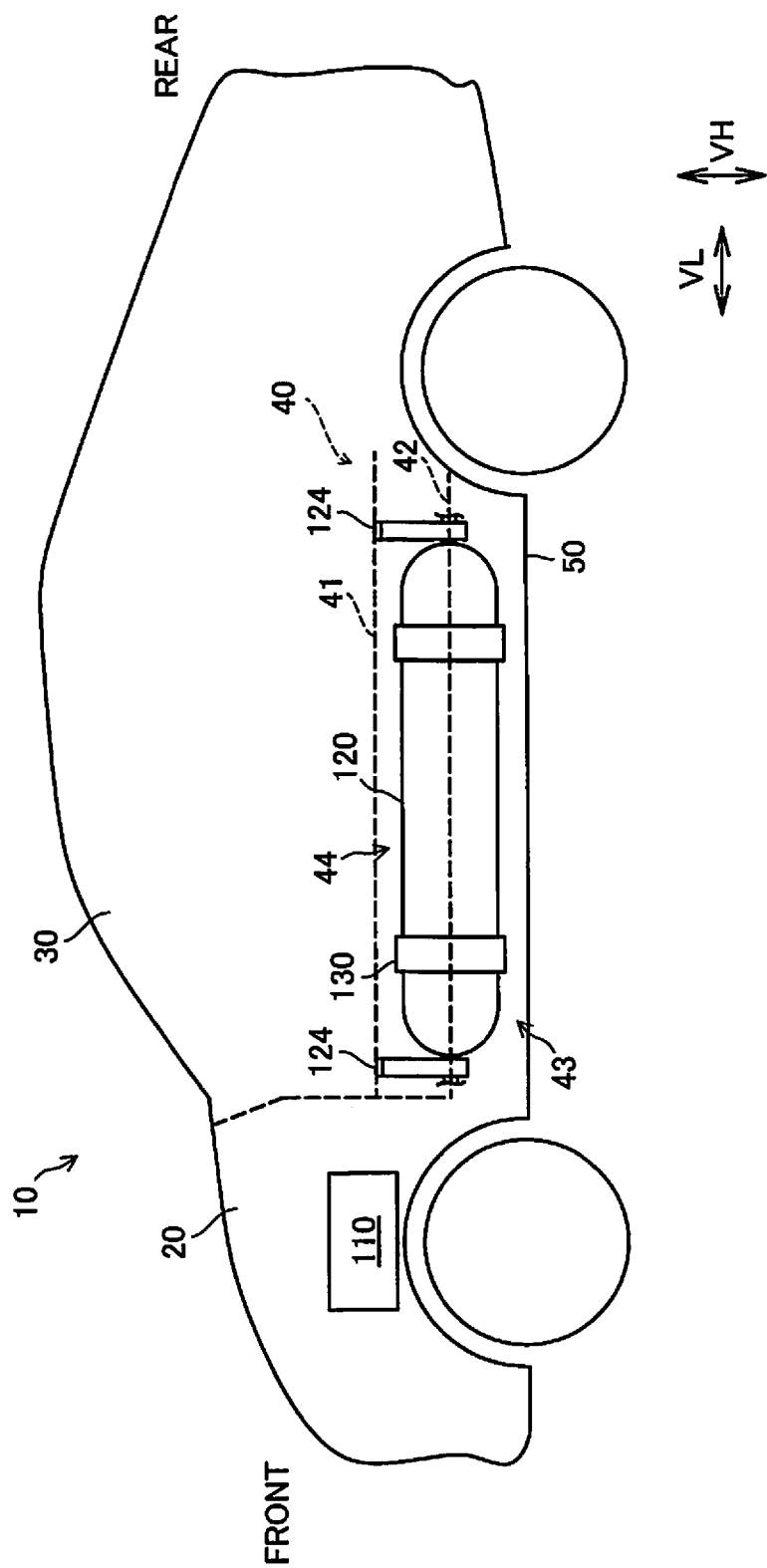
FIG. 1 is an explanatory drawing showing a schematic configuration of a fuel cell vehicle according to a first embodiment of the present disclosure.
Figure 2:
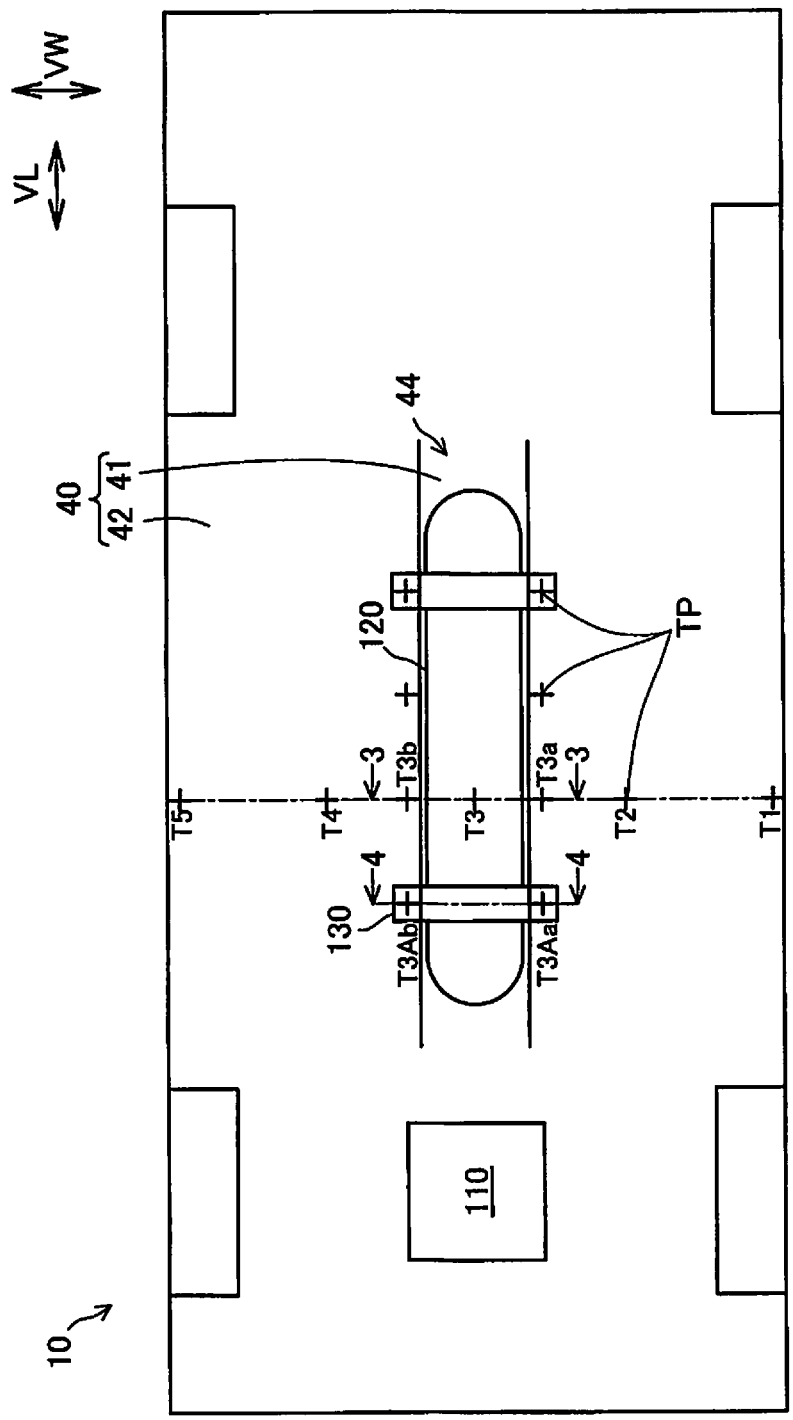
FIG. 2 is an explanatory drawing showing a schematic configuration of the fuel cell vehicle of FIG. 1 viewed from a lower side of a height direction of the vehicle.

FIG. 1 is an explanatory drawing showing a schematic configuration of a fuel cell vehicle 10 according to a first embodiment of the present disclosure. FIG. 2 is an explanatory drawing showing a schematic configuration of the fuel cell vehicle 10 of FIG. 1 viewed from a lower side of a height direction (gravity direction) of the vehicle. The VL shown in FIGS. 1 and 2 indicates a front and rear direction of the vehicle. The VH indicates a height direction of the vehicle. The VW indicates a width direction of the vehicle. This is similar in drawings described hereinafter. Hereinafter, the front and rear direction of the vehicle is sometimes expressed as a "longitudinal direction". The height direction of the vehicle is sometimes expressed simply as a "height direction". The width direction of the vehicle is sometimes expressed simply as a "width direction". In FIG. 2, for convenience of illustration and description, an undercover 50 arranged in a lower surface (bottom surface) of the fuel cell vehicle 10 is omitted.

The fuel cell vehicle 10 according to the present embodiment is mounted with a fuel cell system including a fuel cell 110 and a fuel gas tank 120. Hereinafter, the fuel cell vehicle is sometimes expressed simply as a "vehicle". In FIGS. 1 and 2, various types of components of the fuel cell system other than the fuel cell 110 and the fuel gas tank 120 are omitted for convenience of illustration and description.

The vehicle 10 is an electric vehicle that travels by utilizing electric power to drive a motor not shown. The electric power is generated by electrochemical reaction between a fuel gas (hydrogen) supplied from the fuel gas tank 120 and oxygen in the air, in the fuel cell 110.

The fuel cell 110 is accommodated in a front compartment 20 in a front of a passenger room 30 of the vehicle 10. As described below, the fuel gas tank 120 is mounted in an underfloor of the vehicle 10. The fuel gas tank 120 is a container that stores the fuel gas (hydrogen) utilized in power generation of the fuel cell 110. In the fuel gas tank 120, a belt member 130 that covers the fuel gas tank 120 along the circumferential direction of the fuel gas tank 120 is integrally provided in an end portion of both sides along the longitudinal direction VL of a cylinder portion. The belt member 130 is fixed to a floor 40. The belt member 130 mainly has a function as a protective member of the fuel gas tank 120.

The floor 40 of the vehicle 10 mainly formed of a floor panel has a projecting portion 41 in a center portion of the width direction VW. The projecting portion 41 has a structure of projecting upward of the height direction VH from an other portion 42 (hereinafter, also referred to as a "non-projecting portion 42") and extending along the longitudinal direction VL. In FIG. 1, the floor 40 that has the projecting portion 41 and the non-projecting portion 42 is indicated by a dotted line. In space (underfloor space) 43 under the floor 40, space called a center tunnel of the underfloor of the projecting portion 41 is utilized as a tank arrangement part 44 in which the fuel gas tank 120 is arranged. The fuel gas tank 120 arranged in the tank arrangement part 44 is fixed to the floor 40 by a support member 124 in a front end part and a rear end part of the fuel gas tank 120, to be fixed to the vehicle 10.

In space in the underfloor space 43 other than the tank arrangement part 44, various types of components composing the fuel cell system and other various types of components composing the vehicle are fixed to and arranged in the floor 40. Illustration and description of these components are omitted. In following description, meaning of "being fixed to the floor" includes being fixed to the floor via another member, not only being fixed directly to the floor.

In a lower part of the height direction VH of the underfloor space 43 arranged with the fuel gas tank 120 and other components, the undercover 50 (FIG. 1) that covers lower surface sides of these components is fixed to a body such as the floor 40, the frame of the vehicle 10 and the like. The undercover 50 is attached in order to protect the components arranged in the underfloor space 43 and improve waterproof performance, aerodynamic performance, noise and vibration performance, and the like that are affected by the air flowing in the space in the lower part of the vehicle.

It is desirable that the undercover 50 is fixed to a body (vehicle body) of the vehicle 10 such as the floor 40, the frame, or the like with a fixation pitch that can prevent flapping and decreasing of the fixation strength due to a force received from the air flowing between the undercover 50 and the ground during the travel of the vehicle 10 and vibration of the vehicle 10.

In FIG. 2, cross points TP indicate some example of fixation positions of the undercover 50. Fixation positions T1 to T5 indicate an example of interval of positions in which fixation should be performed along the width direction VW in order to prevent flapping and decreasing of the fixation strength of the undercover 50 described above. Among the fixation positions T1 to T5, the third fixation position T3 in the center overlaps with a cylindrical container of the fuel gas tank 120. Therefore, in the third fixation position T3, the undercover 50 cannot be fixed. In this case, the undercover 50 is not fixed from the second fixation position T2 to the fourth fixation position T4 in the width direction VW. Thus, the fixation pitch is larger than that of when fixation in the third fixation position T3 can be performed. As described above, when the fixation pitch is large, flapping of the undercover may be generated by the force received from the air flowing between the undercover 50 and the ground, vibration of the vehicle, or the like. In addition, the attachment strength may be decreased.

In the present embodiment, the undercover 50 has a structure of being fixed to the floor 40 in side fixation positions T3a, T3b in both sides of the fuel gas tank 120 and the projection portion 41 of the floor 40, instead of the third fixation position T3 in which fixation cannot be performed. Side fixation positions T3a, T3b are located between the second fixation position T2 and the fourth fixation position T4. In a position where the belt member 130 is provided in the fuel gas tank 120, the undercover 50 is fixed to the floor 40 in side fixation positions T3Aa, T3Ab in both sides of the fuel gas tank 120 and the projecting portion 41 of the floor 40.

Figure 3:
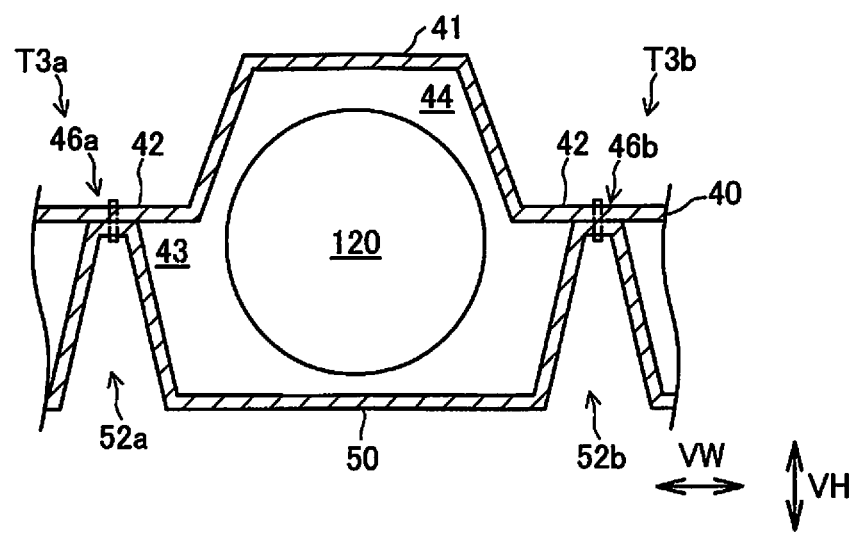
FIG. 3 is an explanatory drawing showing a schematic sectional view taken along the line 3-3 of FIG. 2.

FIG. 3 is an explanatory drawing showing a schematic sectional view taken along the line 3-3 of FIG. 2. In FIG. 3, upward in the drawing indicates upward of the height direction VH, downward in the drawing indicates downward of the height direction VH, and the right and left direction in the drawing indicates the width direction VW.

In the side fixation positions T3a, T3b of sides of the width direction VW of the fuel gas tank 120, the undercover 50 is provided with side fixation protruded portions 52a, 52b. The side fixation protruded portions 52a, 52b project upward of the height direction VH so as to contact with the non-projecting portion 42 of the floor 40. The non-projecting portion 42 of the floor 40 is provided with floor side fixation portions 46a, 46b that contact with the side fixation protruded portions 52a, 52b. The side fixation protruded portions 52a, 52b of the undercover 50 are fixed with the floor side fixation portions 46a, 46b of the floor 40 by fixation members. Thereby, the undercover 50 is fixed to the floor 40 in the side fixation positions T3a, T3b. The fixation members are shown as rectangles (shown by dot-and-dash lines) that are simplified for convenience of illustration. As the fixation members, various members for connecting and fixing two members, such as a bolt, a screw, a bolt and nut, or the like that can be detached can be used.

Figure 4:
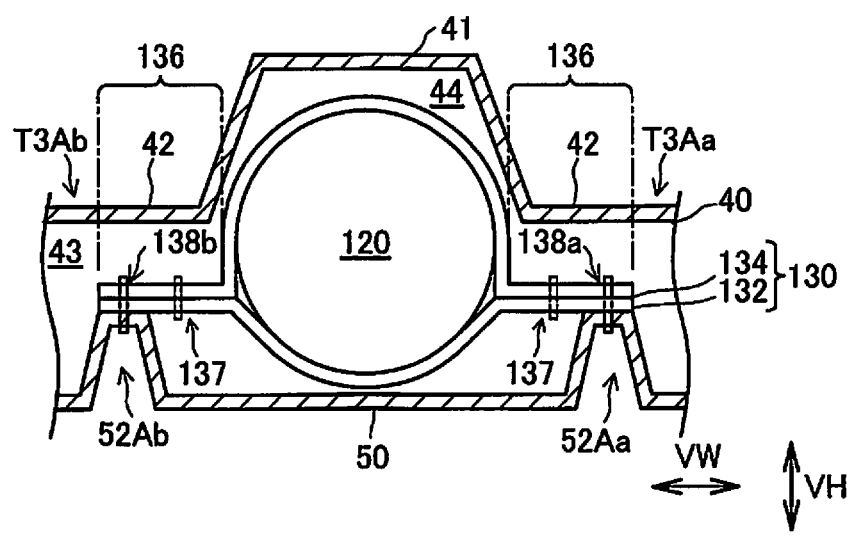
FIG. 4 is an explanatory drawing showing a schematic sectional view taken along the line 4-4 of FIG. 2.

FIG. 4 is an explanatory drawing showing a schematic sectional view taken along the line 4-4 of FIG. 2. FIG. 4 shows cross sections of the side fixation positions T3Aa, T3Ab in the position where the belt member 130 is provided in the fuel gas tank 120 and FIG. 4 corresponds to FIG. 3.

In the position where the belt member 130 is provided in the fuel gas tank 120, the side fixation positions T3Aa, T3Ab are arranged with a belt fixation region 136 for fixing a pair of belt portions 132, 134 composing the belt member 130. The pair of belt portions 132, 134 are fixed by the fixation members in a belt fixation position 137 of the belt fixation region 136. The fixation members are shown as rectangles (shown by broken lines) that are simplified for convenience of illustration. As the fixation members, various members for connecting and fixing two members, such as a bolt, a screw, a bolt and nut, or the like can be used.

In the side fixation positions T3Aa, T3Ab, the undercover 50 is provided with side fixation protruded portions 52Aa, 52Ab that project upward of the height direction VH so as to contact with the belt fixation region 136 in the outside of the belt fixation position 137. In the outside of the belt fixation position 137 of the belt fixation region 136, belt side fixation portions 138a, 138b that contact with the side fixation protruded portions 52Aa, 52Ab are provided. The side fixation protruded portions 52Aa, 52Ab of the undercover 50 are fixed with the belt side fixation portions 138a, 138b of the belt member 130 by fixation members. The fixation members are shown as rectangles (shown by dot-and-dash lines) that are simplified for convenience of illustration. As the fixation members, various members for connecting and fixing two members, such as a bolt, a screw, a bolt and nut, or the like can be used. As shown in FIG. 1, the fuel gas tank 120 is fixed to the floor 40 by the support member 124. Thus, even in the position where the belt member 130 is provided in the fuel gas tank 120, the undercover 50 is fixed to the floor 40 via the belt member 130 in the side fixation positions T3Aa, T3Ab.

As described above, the undercover 50 is fixed to the floor 40 in the side fixation positions T3a, T3b in both sides of the fuel gas tank 120 and the projecting portion 41 of the floor 40 in the position where the belt member 130 is not provided. In the position where the belt member 130 is provided, in the side fixation positions T3Aa, T3Ab in both sides of the fuel gas tank 120 and the projecting portion 41 of the floor 40, the undercover 50 is fixed to the floor 40 via the belt member 130 of the fuel gas tank 120 and the fuel gas tank 120. Thereby, a part from the second fixation position T2 to the fourth fixation position T4 (FIG. 2), the fixation pitch can be smaller than that of when the undercover 50 is not fixed. As a result, the possibility of generation of flapping of the undercover 50 clue to the force received from the air flowing between the undercover 50 and the ground, vibration of the vehicle 10, or the like can be prevented, and decreasing of the attachment strength can be prevented.

In the side fixation positions T3Aa, T3Ab that are in the positions where the belt member 130 is provided, the structure is configured so that the undercover 50 is fixed to the belt member 130. Therefore, the projection amount of the side fixation protruded portions 52Aa, 52Ab of the undercover 50 (FIG. 4) can be smaller than the projection amount of the side fixation protruded portions 52a, 52b of when the undercover 50 is fixed directly to the floor 40 (FIG. 3). Thereby, the manufacturing cost of the undercover 50 can be decreased.

It is preferable that the positions of the side fixation positions T3a, T3b (see FIG. 3) are positions that are as close as possible to the fuel gas tank 120 so that the interval between the first side fixation position T3a and the second side fixation position T3b is as small as possible. Also, it is preferable that the positions of the side fixation positions T3Aa, T3Ab (see FIG. 4) are positions that are as close as possible to the fuel gas tank 120 so that the interval between the first side fixation position T3Aa and the second side fixation position T3Ab is as small as possible. From these points, it is preferable that the positions of the side fixation protruded portions 52a, 52b, 52Aa, 52Ab provided in the undercover 50 are provided in positions that are closer to the fuel gas tank 120 than other components excluding the fuel gas tank 120 and components that should be arranged adjacently to the fuel gas tank 120 among components (not shown) fixed to the floor 40 in the underfloor space 43 under the floor 40.

In the above description, the projecting portion 41 of the floor 40 is described as being provided in the center portion of the width direction VW, in the vehicle 10. However, the position is not limited to that. The projecting portion 41 may be provided in any portion of the width direction VW. Even in this case, the structure of fixation in the embodiment described above can be applied and the effect thereof can be acquired. In addition, this modification can be applied also to embodiments described below.

In the above description, a case where the belt member 130 is provided and the fixation structure corresponding to the belt member 130 exists is described as an example. However, when the belt member 130 is not provided, the fixation structure corresponding to the belt member 130 may not be existed and it is enough that a fixation structure corresponding to the position where the belt member 130 is not provided is applied. This modification can be applied similarly to embodiments described below.

B. Second Embodiment

Figure 5:
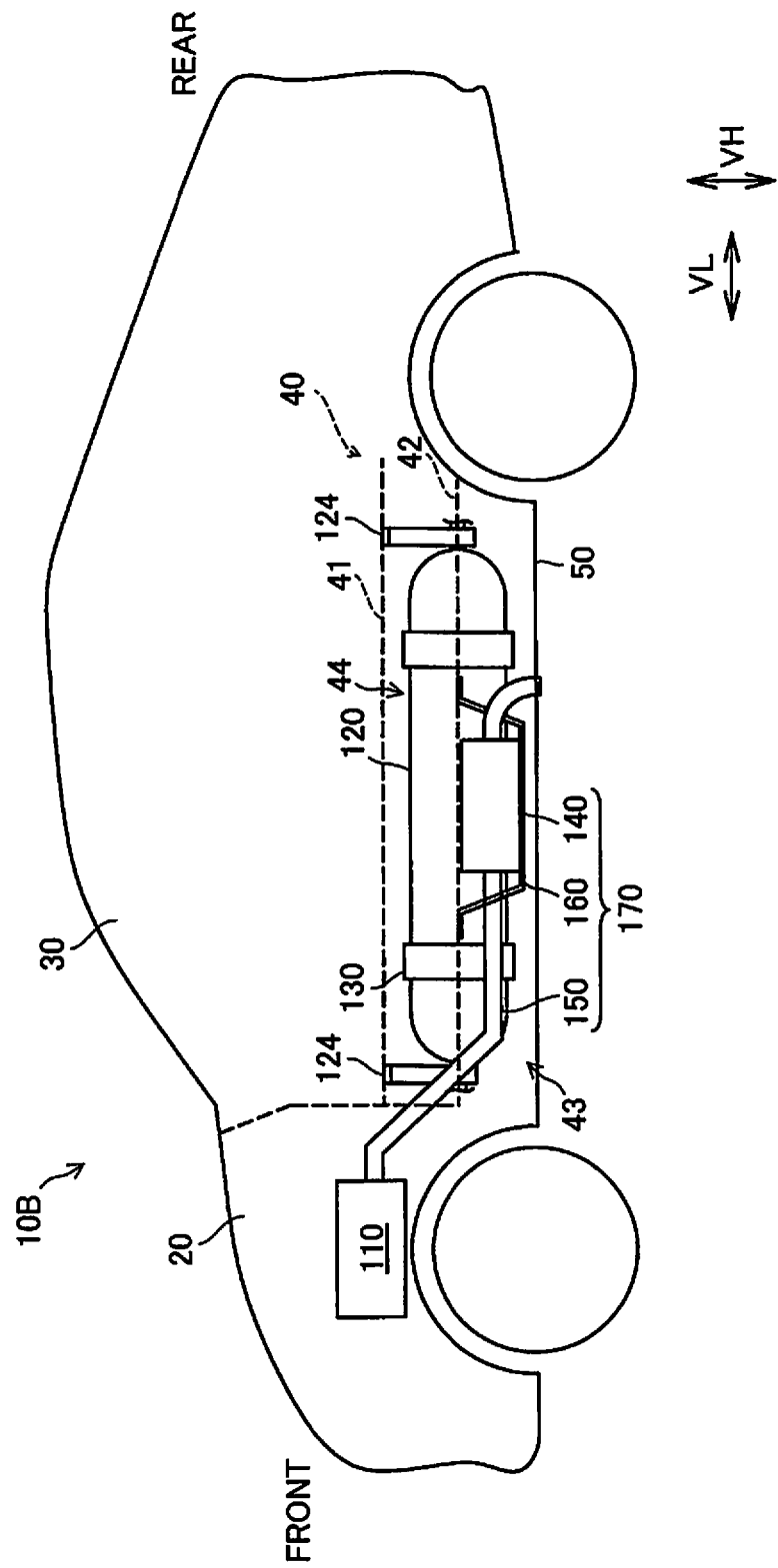
FIG. 5 is an explanatory drawing showing a schematic configuration of a fuel cell vehicle according to a second embodiment of the present disclosure.
Figure 6:
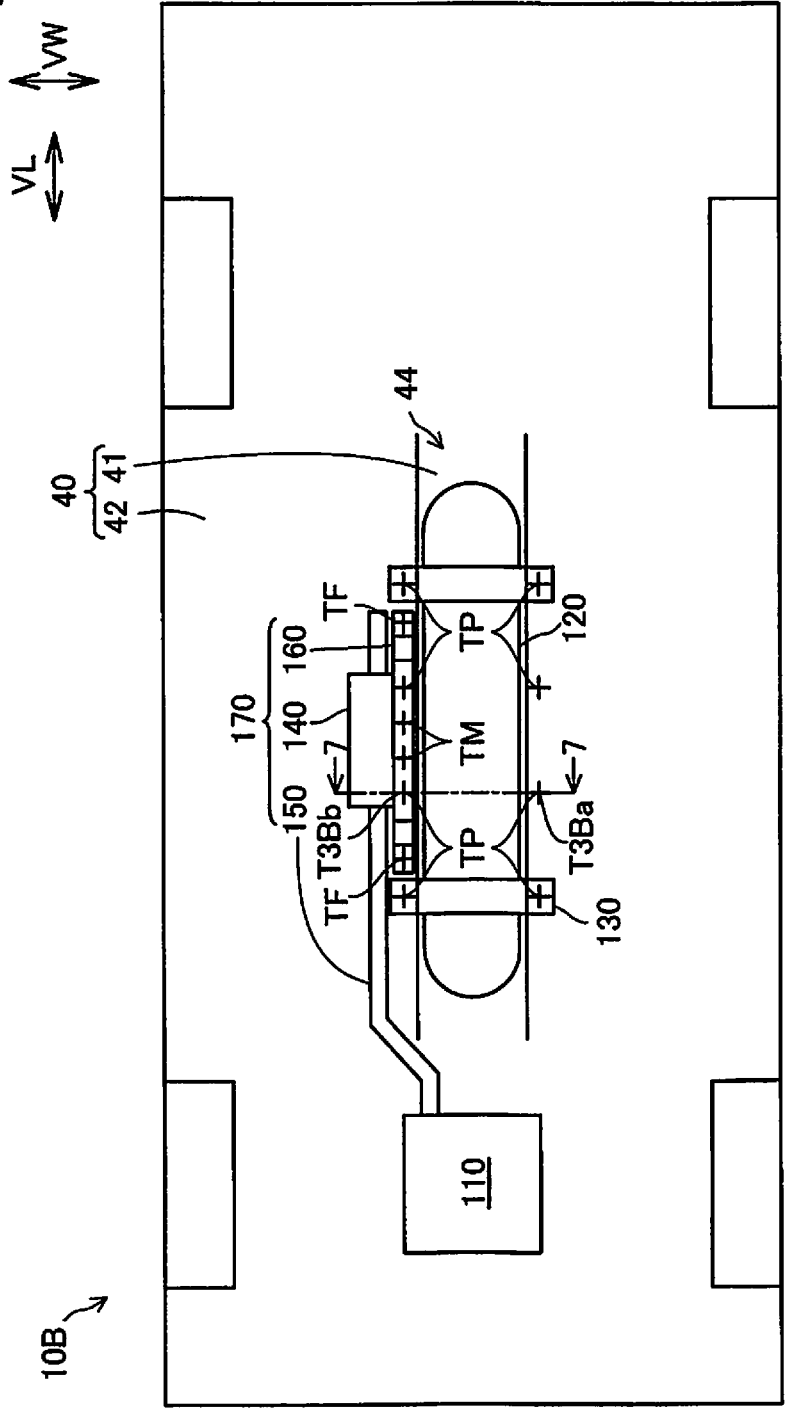
FIG. 6 is an explanatory drawing showing a schematic configuration of the fuel cell vehicle of FIG. 5 viewed from a lower side of a height direction of the vehicle.

FIG. 5 is an explanatory drawing showing a schematic configuration of a fuel cell vehicle 10B according to a second embodiment of the present disclosure. FIG. 6 is an explanatory drawing showing a schematic configuration of the fuel cell vehicle 10B of FIG. 5 viewed from a lower side of a height direction (gravity direction) of the vehicle. FIG. 5 corresponds to FIG. 1 and FIG. 6 corresponds to FIG. 2.

The fuel cell vehicle 10B of the second embodiment is different from the fuel cell vehicle 10 of the first embodiment in that an exhaust device 170 is arranged adjacently to the fuel gas tank 120, and a fixation structure of the undercover 50 corresponding to arrangement of the exhaust device 170 is included. Other structures are similar to those in the first embodiment. Following describes only different features from the first embodiment.

As shown in FIGS. 5 and 6, a muffler 140 of the exhaust device 170 is arranged adjacently to the fuel gas tank 120 and an exhaust pipe 150 connecting the muffler 140 and the fuel cell 110 is arranged. The muffler 140 is fixed to the non-projecting portion 42 of the floor 40, while being supported by a bracket 160 in a portion that is the fuel gas tank 120 side of a bottom portion of the muffler 140. In FIG. 6, the cross points TM indicate fixation positions of the bracket 160 and the muffler 140. The cross points TF indicate fixation positions of the bracket 160 and the non-projecting portion 42 of the floor 40. The cross points TP indicate some of the fixation positions of the undercover 50 as similar to FIG. 2.

Figure 7:
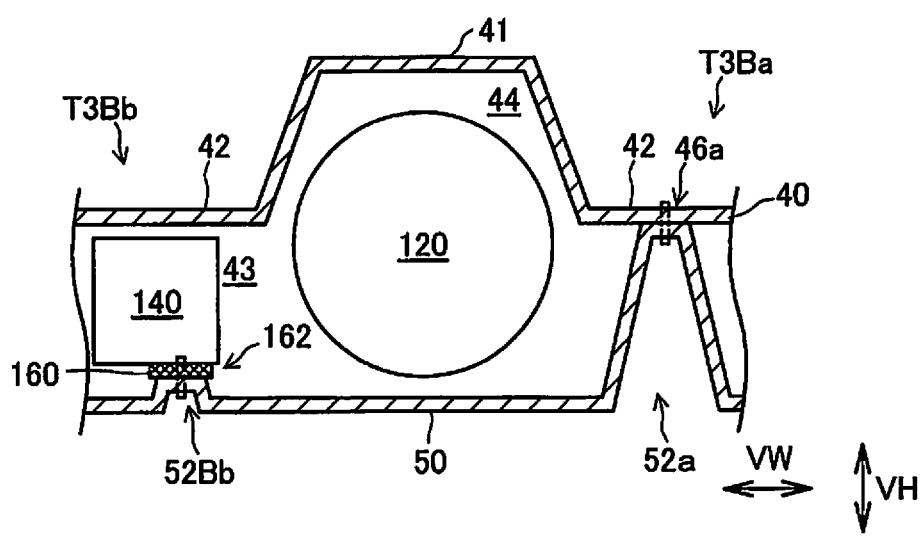
FIG. 7 is an explanatory drawing showing a schematic sectional view taken along the line 7-7 of FIG. 6.

FIG. 7 is an explanatory drawing showing a schematic sectional view taken along the line 7-7 of FIG. 6. FIG. 7 shows cross sections of side fixation positions T3Ba, T3Bb in the position where the muffler 140 is arranged adjacently to the fuel gas tank 120 and FIG. 7 corresponds to FIGS. 3 and 4.

The structure in the first side fixation position T3Ba is the same as that of the first side fixation position T1a (FIG. 3) in the first embodiment. The first side fixation protruded portion 52a of the undercover 50 and the first floor side fixation portion 46a of the non-projecting portion 42 of the floor 40 are fixed by the fixation member.

On the other hand, the second side fixation position T3Bb is arranged with the bracket 160 that supports the muffler 140 and fixes the muffler 140 to the floor 40. In the second side fixation position T3Bb, the undercover 50 is provided with a side fixation protruded portion 52Bb that projects upward of the height direction VH so as to contact with the bracket 160. In the bracket 160, a bracket side fixation portion 162 is provided. The second side fixation protruded portion 52Bb of the undercover 50 is fixed with the bracket side fixation portion 162 of the bracket 160 by fixation members. The fixation members are shown as rectangles (shown by dot-and-dash lines) that are simplified for convenience of illustration. As the fixation members, various members for connecting and fixing two members, such as a bolt, a screw, a bolt and nut, or the like that can be detached can be used. As shown in FIG. 5, the bracket 160 is fixed to the non-projecting portion 42 of the floor 40.

Thus, even when the muffler 140 of the exhaust device 170 is arranged adjacently to the fuel gas tank 120, the undercover 50 is fixed directly to the floor 40 in the side fixation position T3Ba, and the undercover 50 is fixed to the floor 40 via the bracket 160 fixed with the muffler 140 in the side fixation position T3Bb.

As described above, the undercover 50 is fixed to the floor 40 in the side fixation positions T3Ba, T3Bb in both sides of the fuel gas tank 120 and the projecting portion 41 of the floor 40 in the position where the muffler 140 of the exhaust device 170 is arranged adjacently to the fuel gas tank 120. Thereby, a part from the second fixation position T2 to the fourth fixation position T4 (FIG. 2), the fixation pitch can be smaller than that of when the undercover 50 is not fixed. As a result, the possibility of generation of flapping of the undercover 50 due to the force received from the air flowing between the undercover 50 and the ground, vibration of the vehicle 10B, or the like can be prevented, and decreasing of the attachment strength can be prevented.

In the side fixation position T3Bb in which the muffler 140 of the exhaust device 170 is arranged adjacently to the fuel gas tank 120, the structure is configured so that the undercover 50 is fixed to the bracket 160 that supports and fixes the muffler 140. Therefore, the projection amount of the side fixation protruded portion 52Bb of the undercover 50 can be smaller than the projection amount of the side fixation protruded portion 52a of when the undercover 50 is fixed directly to the floor 40. Thereby, the manufacturing cost of the undercover 50 can be decreased.

It is preferable that the positions of the side fixation positions T3Ba, T3Bb (see FIG. 7) are positions that are as close as possible to the fuel gas tank 120 so that the interval between the first side fixation position T3Ba and the second side fixation position T3Bb is as small as possible. From these points, it is preferable that the position of the side fixation protruded portion 52Bb provided in the undercover 50 is, as similar to the side fixation protruded portions 52a, 52b, 52Aa, 52Ab described in the first embodiment, provided in a closer position to the fuel gas tank 120 than other components excluding the fuel gas tank 120 and components that should be arranged adjacently to the fuel gas tank 120 among components (not shown) fixed to the floor 40 in the underfloor space 43 under the floor 40.

The components that should be arranged adjacently to the fuel gas tank 120 are components that are preferably arranged adjacently to the fuel gas tank 120 preferentially in consideration with efficient and compact arrangement. "Being arranged adjacently to the fuel gas tank 120" means being arranged in a side of the fuel gas tank 120 not via other components and only with a certain clearance that is predetermined. As an example of that, in the second embodiment, in the exhaust device 170 connected to the fuel cell 110 and arranged adjacently to the fuel gas tank 120 in the side of the width direction VW, particularly, the muffler 140 is included. The exhaust device 170 is connected to the fuel cell 110 and has the exhaust pipe and the muffler arranged along the longitudinal direction VL, as similar to the fuel gas tank 120 that is long along the longitudinal direction VL. Thus, adjacent arrangement to the fuel gas tank 120 can provide more efficient and compact arrangement.

In the above description, the undercover 50 is fixed to the bracket 160 in the second side fixation protruded portion 52Bb of the undercover 50 and fixed to the muffler 140 via the bracket 160. However, fixation is not limited to these. The undercover 50 may be fixed in the second side fixation protruded portion 52Bb directly to a lower surface of the height direction VH of the muffler 140. Thus, "being fixed to the muffler" of the undercover includes being fixed directly to the muffler and being fixed indirectly to the muffler via a member (bracket 160) for fixing the muffler to the floor.

C. Modification

The present disclosure is not limited to the embodiments and modification described above, and may be performed in various modes without departing from the scope of the disclosure. For example, following modifications are available.

C1. Modification 1

In the second embodiment described above, as a component that should be arranged adjacently to the fuel gas tank 120, the muffler 140 of the exhaust device 170 is exemplified. However, the component that should be arranged adjacently to the fuel gas tank 120 is not limited to this. As described above, when a component that is preferably arranged adjacently to the fuel gas tank 120 preferentially in consideration with efficient and compact arrangement is arranged adjacently to the fuel gas tank 120, the undercover 50 may be fixed by a fixation protruded portion provided under this component.

C2. Modification 2

It is described for the first and second embodiments described above that it is preferable that the position of the side fixation protruded portion provided in the undercover 50 is provided in a position that is closer to the fuel gas tank 120 than other components excluding the fuel gas tank 120 and components that should be arranged adjacently to the fuel gas tank 120 among components fixed to the floor 40 in the underfloor space 43 under the floor 40. This is to make the side fixation position in which the undercover 50 is fixed in the side of the fuel gas tank 120 to be a position that is as close as possible to the fuel gas tank 120 to prevent the fixation pitch from increasing. In consideration with this purpose, it is preferable that the side fixation protruded portion provided in the undercover 50 is provided in a closer position to the fuel gas tank 120 in the width direction VW than one or more components fixed to the floor 40 under the floor 40. Even with this configuration, the undercover 50 can be fixed to the floor in a closer position to the fuel gas tank 120 than the one more components fixed to the floor 40. Thus, the fixation pitch can be prevented from increasing.

The present disclosure is not limited to the embodiments described above and can be achieved in various configurations without departing from a scope of the present disclosure. For example, the technical features of the embodiments corresponding to the technical features in the embodiments described in the column of the summary of the present disclosure, can be changed or combined as appropriate in order to solve a part or all of the problem described above or achieve a part or all of the effect described above. When a technical feature is not described as essential in the specification, the feature can be deleted as appropriate.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) According to an embodiment of the present disclosure, a fuel cell vehicle mounted with a fuel gas tank in an underfloor of the vehicle is provided. The fuel cell vehicle includes: a floor that has a projecting portion projecting upward in a height direction of the vehicle and extending along a front and rear direction of the vehicle; a fuel gas tank arranged under the projecting portion in the height direction of the vehicle and fixed to the floor; and an undercover arranged under the fuel gas tank in the height direction of the vehicle. the undercover has a fixation protruded portion that projects upward in the height direction of the vehicle in a side of the fuel gas tank in a width direction of the vehicle, and being fixed to the floor by the fixation protruded portion.

According to the fuel cell vehicle of this embodiment, the undercover is fixed to the floor by the fixation protruded portion that projects upward of the height direction of the vehicle in the side of the width direction of the vehicle of the fuel gas tank. Therefore, the fixation pitch of the undercover can be prevented from increasing, and generation of flapping of the undercover and decreasing of the attachment strength can be prevented.

(2) In the fuel cell vehicle according to the embodiment described above, the fuel cell vehicle has a muffler included in an exhaust device arranged in a side of the fuel gas tank in the width direction of the vehicle, and fixed to the floor. The undercover has the fixation protruded portion under the muffler, and is fixed to the floor via the muffler by being fixed to the muffler in the fixation protruded portion.

According to the fuel cell vehicle of this embodiment, by fixation of the undercover to the muffler included in the exhaust device arranged adjacently to the fuel gas tank, the undercover can be fixed to the floor via the muffler. The projection amount of the fixation protruded portion for fixing the undercover to the muffler can be decreased from the projection amount of the fixation protruded portion of when the undercover is fixed to the floor. Thus, the manufacturing cost can be decreased.

(3) In the fuel cell vehicle according to the embodiment described above, the fuel gas tank includes a belt member that covers the fuel gas tank along a circumferential direction of the fuel gas tank. The undercover has the fixation protruded portion under the belt member and in the side of the fuel gas tank in the width direction of the vehicle, and is fixed to the floor via the fuel gas tank by being fixed to the belt member in the fixation protruded portion.

According to the fuel cell vehicle of this embodiment, by fixation of the undercover to the belt member that covers the fuel gas tank along the circumferential direction of the fuel gas tank, the undercover can be fixed to the floor via the belt member and the fuel gas tank. The projection amount of the fixation protruded portion for fixing the undercover to the belt member can be decreased from the projection amount of the fixation protruded portion of when the undercover is fixed to the floor. Thus, the manufacturing cost can be decreased.

(4) In the fuel cell vehicle according to the embodiment described above, the fixation protruded portion is provided in a closer position to the fuel gas tank in the width direction of the vehicle than one or more components fixed to the floor under the floor in the height direction of the vehicle.

According to the fuel cell vehicle of this embodiment, an interval of the fixation protruded portions provided in the side of the fuel gas tank can be smaller.

The present disclosure can be achieved in various embodiments. For example, in addition to the fuel cell vehicle, the present disclosure can be achieved in embodiment as a fixation structure of the undercover of the fuel cell vehicle, or the like.

What is claimed is:

1. A fuel cell vehicle mounted with a fuel gas tank in an underfloor of the vehicle, the fuel cell vehicle comprising:
    a vehicle body comprising a floor that has a projecting portion projecting upward in a height direction of the vehicle and extending along a front and rear direction of the vehicle, wherein said vehicle body is a frame of the fuel cell vehicle;
    a fuel gas tank arranged under the projecting portion in the height direction of the vehicle and fixed to the floor;
    an undercover arranged under the fuel gas tank in the height direction of the vehicle,
    the undercover having two fixation protruded portions that project upward in the height direction of the vehicle on opposite sides of the fuel gas tank in a width direction of the vehicle, and being fixed to the floor by the fixation protruded portion;
    a belt member that covers the fuel gas tank along a circumferential direction of the fuel gas tank,
    wherein the undercover has the fixation protruded portion under the belt member and in the side of the fuel gas tank in the width direction of the vehicle, and is fixed to the floor via the fuel gas tank by being fixed to the belt member in the fixation protruded portion; and
    further comprising first fixation members fixing the fixation protruded portion to the belt member, and second fixation members between the first fixation members and the fuel gas tank.

2. The fuel cell vehicle in accordance with claim 1, wherein
    the fuel cell vehicle has a muffler included in an exhaust device arranged in a side of the fuel gas tank in the width direction of the vehicle, and fixed to the floor, and
    the undercover has the fixation protruded portion under the muffler, and is fixed to the floor via the muffler by being fixed to the muffler in the fixation protruded portion.

3. The fuel cell vehicle in accordance with claim 1, wherein the fixation protruded portion is provided in a closer position to the fuel gas tank in the width direction of the vehicle than one or more components fixed to the floor under the floor in the height direction of the vehicle.

* * * * *